United States Patent [19]

Yoshida et al.

[11] 4,112,141
[45] Sep. 5, 1978

[54] METHOD OF USING FILLING SOLDER FOR AUTOMOBILE BODY

[75] Inventors: Eiichi Yoshida, Utsunomiya; Hideo Nakao, Shimo-tsuga; Norimasa Goto, Utsunomiya; Toul Sugiyama, Kaminokawa; Sadao Kashiwaya, Mibu, all of Japan

[73] Assignee: Nissan Motor Company, Limited, Japan

[21] Appl. No.: 789,861

[22] Filed: Apr. 22, 1977

[30] Foreign Application Priority Data

May 6, 1976 [JP] Japan ................................ 51-51477

[51] Int. Cl.² ........................................... C22C 11/00
[52] U.S. Cl. ................................. 427/142; 29/401 A; 75/166 B
[58] Field of Search ......................... 29/401 R, 401 A; 228/119, 263; 75/166 B, 166 C; 427/142

[56] References Cited

U.S. PATENT DOCUMENTS

| 1,075,661 | 10/1913 | McConnell | 75/166 C |
|---|---|---|---|
| 1,807,788 | 6/1931 | Kemp | 75/166 C |
| 2,148,741 | 2/1939 | Gonser | 75/166 C |
| 2,221,677 | 11/1940 | Grimditch | 75/166 B |
| 2,370,439 | 2/1945 | Beard | 75/166 C |
| 3,197,862 | 8/1965 | Harvey | 75/166 C |
| 3,923,501 | 12/1975 | DiMartini | 75/166 B |

FOREIGN PATENT DOCUMENTS

| 555,154 | 8/1943 | United Kingdom | 75/166 C |
|---|---|---|---|
| 1,074,861 | 7/1967 | United Kingdom | 75/166 C |

Primary Examiner—M. J. Andrews
Attorney, Agent, or Firm—Robert E. Burns; Emmanuel J. Lobato; Bruce L. Adams

[57] ABSTRACT

A solder for filling or padding operations on automobile bodies, consisting essentially of 2.0–7.0 Wt% antimony, optionally less than 5.0 Wt% of tin and the balance of lead. This solder is inexpensive and exhibits good physical properties at high temperatures principally due to its high solidus temperature of above 240° C. The use of this solder is particularly advantageous when the filling or padding operations are preparatory to a surface coating operation in which a high baking temperature is employed for hardening enamel paint or varnish.

1 Claim, 3 Drawing Figures

METHOD OF USING FILLING SOLDER FOR AUTOMOBILE BODY

BACKGROUND OF THE INVENTION

This invention relates to a solder for padding or filling operations on automobile bodies.

In the manufacture of automobile bodies, a repairing or smoothing operation is generally needed for filling in dents in the bodies and spaces in joints of sheet metal parts as a preparatory step to a surface coating operation. Commonly a lead-base alloy solder of the type known as filling solder, padding solder or body solder is used as the filling material in this smoothing operation. Filling solders currently in practical use for this operation contain a relatively large amount, for example, about 13-25 Wt%, of tin and a smaller amount of (for example, 2% or less) antimony.

A high percentage of tin in a lead-base filling solder affords the solder a good workability needed for the described use but inevitably renders the solder considerably expensive. Since the reduction of production costs is one of primary concerns of the present-day automobile industry, even the price of the filling solder is a matter of concern. Besides, the use of conventional filling solders offers a problem to the subsequent coating operation. In the surface coating operation, it is a current trend to use resin-base paints and varnishes which need a high temperature baking process for hardening. Sometimes the baking temperature is as high as 200° C or even above. Then the above described conventional filling solders, applied to the automobile bodies, tend to locally soften or physically weaken and cause the appearance of defects such as blow-holes and traces of trickles on the coated surface.

SUMMARY OF THE INVENTION

It is an object of the present invention to solve the above described problems confronting a smoothing operation for filling in dents and spaces in automobile bodies as a preparatory step to coating of the body surface with enamel paint or varnish which is to be hardened by baking.

It is another object of the invention to provide a filling solder for use on automobile bodies, which solder is inexpensive, satisfactory in workability and advantageous in physical properties at high temperatures as experienced in bake-hardening of enamel paints or varnishes coated on the bodies.

According to the invention, a binary alloy consisting essentially of 2.0-7.0 Wt% antimony and the balance of lead is used as a filling solder in the above described smoothing operation on automobile bodies.

This filling solder is characterized primarily by containing neither tin, which is costly but has commonly been contained in conventional filling solders, nor any of hitherto proposed improving additives. Accordingly this filling solder can be provided at remarkably reduced material and labor costs compared with conventional filling solders.

The amount of antimony in this filling solder is specified to range from 2.0 to 7.0% from the following reasons. If the antimony content is less than 2.0%, the alloy shows a close resemblance to lead in various properties and lacks in good ductility and formability needed for use as solder. The alloy becomes very hard and unsatisfactory both in ductility and workability if it contains more than 7.0% of antimony.

On automobile bodies, the filling of dents and spaces between sheet metal parts can smoothly be accomplished by the use of this filling solder. The physical properties of this solder during and after its application are excellent. Besides, the use of this alloy as a filling solder on automobile bodies has an advantage that the solder applied to the bodies does not soften at all during a subsequent surface coating operation, in which hardening of enamel paint or varnish is accomplished in many cases at a baking temperature of about 200° C or even above, since the solidus of this alloy lies above about 240° C.

It is possible to slightly improve the workability of the lead-antimony alloy by modifying it to a ternary lead alloy containing tin in addition to antimony. The introduction of tin means a substantial rise in the price of the solder. When the ternary alloy contains a large amount of tin, the improvement on the workability is not great enough to balance or compensate for the rise in price. In the present invention it is optional to use this type of ternary alloy as a filling solder so long as the ternary alloy consists essentially of 2.0-7.0 Wt% antimony, less than 5.0 Wt% tin and the balance of lead.

DESCRIPTION OF PREFERRED EMBODIMENTS

Figure 1:
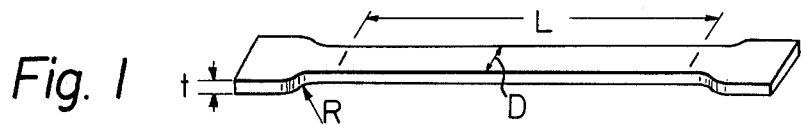
FIG. 1 is a perspective view of a specimen used in Examples for testing the tensile strength of alloys.

Examples 1-12 presented in Table 2 illustrate the properties of filling solders according to the invention. For comparison, Table 1 shows the properties of four differently composed conventional lead-tin-antimony solders for padding and filling use. The tensile strength and elongation data in Tables 1 and 2 were obtained by a usual tensile test with an Amsler testing machine. Tensile specimens as shown in FIG. 1 were prepared from each solder alloy by machining and the test was carried out at room temperature. The width D, thickness t and gage length L of the specimen were respectively 15 mm, 4.5 mm and 100 mm. The radius of curvature R was 30 mm.

Table 1

| | Composition (Wt %) | | | Thermal property | | Mechanical properties | |
|---|---|---|---|---|---|---|---|
| | Sn | Sb | Pb | Solidus temp. (° C) | Liquidus temp. (° C) | Tensile strength (kg/mm$^2$) | Elongation (%) |
| Ref.1 | 23.5 | 1.5 | 75 | 228 | 263 | 3.5 | 60 |
| Ref.2 | 20.5 | 1.5 | 78 | 212 | 266 | 3.8 | 62 |
| Ref.3 | 14.5 | 1.5 | 84 | 228 | 277 | 3.9 | 70 |
| Ref.4 | 13.0 | 1.5 | 85.5 | 234 | 279 | 3.8 | 70 |

Table 2

| Example No. | Composition (Wt %) | | | Thermal property | | Mechanical properties | |
|---|---|---|---|---|---|---|---|
| | Sn | Sb | Pb | Solidus temp. (° C) | Liquidus temp. (° C) | Tensile strength (kg/mm$^2$) | Elongation (%) |
| 1 | 0 | 2.0 | 98 | 248 | 317 | 3.5 | 40 |

Table 2-continued

| Example No. | Composition (Wt %) | | | Thermal property | | Mechanical properties | |
|---|---|---|---|---|---|---|---|
| | Sn | Sb | Pb | Solidus temp. (° C) | Liquidus temp. (° C) | Tensile strength (kg/mm²) | Elongation (%) |
| 2 | 0 | 5.0 | 95 | 250 | 300 | 3.9 | 38 |
| 3 | 0 | 5.0 | 94 | 250 | 299 | 4.2 | 38 |
| 4 | 0.5 | 2.0 | 97.5 | 248 | 315 | 4.0 | 33 |
| 5 | 0.5 | 4.0 | 95.5 | 250 | 300 | 4.2 | 37 |
| 6 | 0.5 | 6.0 | 93.5 | 250 | 299 | 4.5 | 36 |
| 7 | 2.0 | 2.0 | 96 | 246 | 311 | 4.1 | 36 |
| 8 | 2.0 | 5.0 | 93 | 244 | 292 | 4.9 | 33 |
| 9 | 2.0 | 6.5 | 91.5 | 245 | 287 | 5.2 | 29 |
| 10 | 4.5 | 2.0 | 93.5 | 246 | 305 | 4.3 | 40 |
| 11 | 4.5 | 5.0 | 90.5 | 246 | 287 | 4.9 | 38 |
| 12 | 4.5 | 6.5 | 89 | 246 | 281 | 5.7 | 35 |

As seen in these Tables, a tin-free solder according to the invention has approximately the same tensile strength as the conventional solders containing a relatively large amount of tin and a relatively small amount of antimony. The tin-free solders (Examples 1–3) exhibit less elongation than the conventional solders of Table 1, but the elongation values of Examples 1–3 are still great enough to allow the industrial use of these solders in filling and padding works on automobile bodies.

As to the thermal property, the solder alloys of Examples 1–3 exhibit a general rise in solidus temperature by about 15–40° C compared with the solder alloys of Table 1. However, the rise in solidus temperature is accompanied with a general rise of nearly the same scale in liquidus temperature. As a result, the solder alloys of Examples 1–3 have almost the same width of plastic range as the reference solder alloys and accordingly maintain a good workability as filling solders.

The tin-containing solder alloys of Examples 4–12 too are suitable as filling solders for automobile bodies as understood from the data in Table 2. There is a tendency that an increase in the amount of tin causes a slight rise in solidus temperature. Also an increase in tensile strength is observed with increase in the tin content, particularly when the ternary alloys contain a relatively large amount of antimony (within the range of 2–7%).

Figure 2:
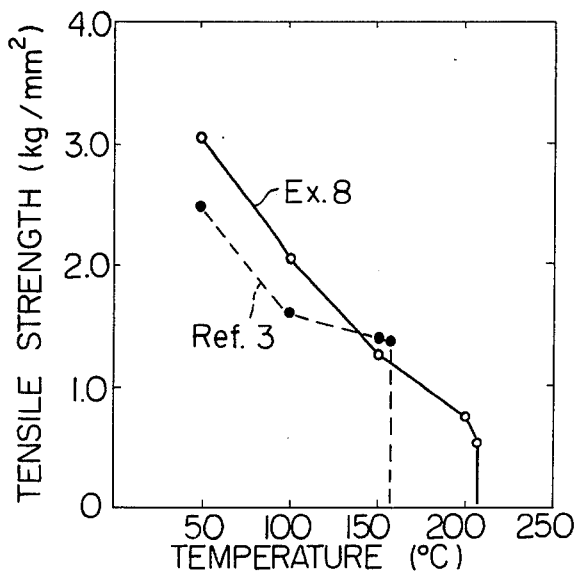
FIG. 2 is a graph showing the dependence of the tensile strength on temperature for a filling solder according to the invention and a conventional filling solder.
Figure 3:
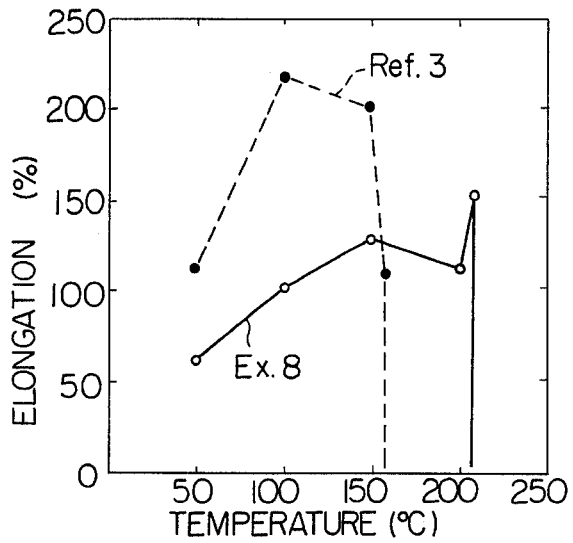
FIG. 3 is a graph showing the dependence of the elongation on temperature for the same solders.

For the ternary solder alloy of Example 8 and the conventional solder alloy of Reference 3, the tensile strength and elongation were measured also at various temperatures between 50° and 250° C. The results are shown in FIGS. 2 and 3. As shown, the tensile strength (hence the elongation too) of the conventional solder alloy became zero when the test temperature was above 160° C, but the same was observed for the solder alloy of Example 8 only when the temperature exceeded 210° C.

As demonstrated by the data in Table 2 and FIGS. 2-3, a filling solder according to the invention has a solidus temperature of above 240° C and exhibits a substantial tensile strength and elongation even at about 200° C. As mentioned hereinbefore, the baking temperature for accomplishing surface coating of automobile bodies with resin-base enamel paints or varnishes sometimes exceeds, at least locally, 200° C. When the filling operation on the bodies preparatory to the coating is accomplished by the use of a filling solder according to the invention, there is practically no fear that the applied solder locally softens and causes the appearance of blow-holes and or irregularities such as traces of trickles on the coated surface.

The toughness of the solders of the above Examples was confirmed by performing usual fatigue tests on automobile bodies to which the solders were applied. No defects such as cracks appeared on the surface of the applied solders or at interfaces between the applied solders and sheet metal parts of the bodies.

To verify practical utility of the solder alloys prepared in Examples in the production of automobile bodies, the solders of Examples 2, 5, 8 and 11 were used for filling irregularities in a boundary region between a roof panel assembly and a rear fender panel assembly. Each of these solders was applied with a paddle to the uneven body surface in the boundary region so as to somewhat heap up on the surface, using a gas burner for keeping the solder in a plastic state. After solidification, the solder heaped on the body was smooth finished by means of a sander. The thus treated body was subjected to a coating operation which consisted of the following procedures. Firstly, undercoating was accomplished by the application of a polybutadiene paint, which was fixed by baking at 180°–200° C for 30 min. Then a melamine enamel paint was applied as a second coat and hardened by heating at 150°–170° C for 30 min. The coating was finished by applying a malamine varnish and bake-hardening the varnish at 180°–200° C for 20 min. The coated body was inspected very closely, but no defect was found in the preparatorily solder-filled region (more accurately, this region was hardly identifiable) irrespective of the composition of the tested solders.

The price of a lead-antimony binary solder alloy according to the invention is estimated to be about 50% of conventional filling solders containing about 14–18.5 Wt% tin (based on the prices of the raw materials at the end of 1975). The price of the ternary solder alloy containing less than 5% of tin may be about 70–80% of such conventional filling solders.

Thus, the invention accomplishes a considerable cost reduction in padding and filling operations on automobile bodies without any substantially unfavorable influence, even with some improvement, on the qualitative side of the result.

What is claimed is:

1. In a method of smoothing a body of an automobile by filling in dents in the body and spaces between parts of the body with a lead-base filling solder as a preparatory step to coating of the body surface with enamel paint or varnish which is hardened by baking, the improvement comprising the use of a solder alloy which is a binary alloy and consists essentially of 2.0-7.0 Wt.% antimony, and the balance of lead as said filling solder.

* * * * *